United States Patent [19]

Lauderbach

[11] Patent Number: 4,692,057
[45] Date of Patent: Sep. 8, 1987

[54] TAPER CONNECTION ON A CHAIR OR TABLE COLUMN OF ADJUSTABLE HEIGHT

[75] Inventor: Leo Lauderbach, Steinbach, Fed. Rep. of Germany

[73] Assignee: Stabilus GmbH, Fed. Rep. of Germany

[21] Appl. No.: 859,085

[22] Filed: May 2, 1986

[30] Foreign Application Priority Data

May 10, 1985 [DE] Fed. Rep. of Germany ....... 3517003

[51] Int. Cl.$^4$ .................. B25G 3/00; F16M 11/00
[52] U.S. Cl. .................... 403/334; 403/186; 403/361; 248/161; 248/404
[58] Field of Search ............. 403/334, 333, 343, 186, 403/188, 230, 361, 197; 248/161, 404

[56] References Cited

U.S. PATENT DOCUMENTS

| 797,820 | 8/1905 | Peck | 403/334 X |
|---|---|---|---|
| 1,849,067 | 3/1932 | Bridges | 403/334 |
| 2,714,320 | 8/1955 | McDonald | 403/334 X |
| 2,810,598 | 10/1957 | Lief | 403/334 |
| 3,285,639 | 11/1966 | Galla et al. | 403/334 X |
| 3,790,119 | 2/1974 | Bauer | 248/161 |
| 4,101,186 | 7/1978 | Georgiev et al. | 403/334 X |
| 4,113,220 | 9/1978 | Godwin et al. | 248/404 X |
| 4,441,273 | 4/1984 | McMickle et al. | 403/334 X |
| 4,580,749 | 4/1986 | Howard | 248/161 |

FOREIGN PATENT DOCUMENTS

| 801,546 | 1/1951 | Fed. Rep. of Germany . |
|---|---|---|
| 846,039 | 4/1953 | Fed. Rep. of Germany . |
| 1831,650 | 5/1961 | Fed. Rep. of Germany . |
| 1839,696 | 10/1961 | Fed. Rep. of Germany . |

Primary Examiner—Cornelius J. Husar
Assistant Examiner—Todd G. Williams
Attorney, Agent, or Firm—Brumbaugh, Graves, Donohue & Raymond

[57] ABSTRACT

A taper connection between a chair column and a seat plate is proposed. The external taper of the chair column adjoins a cylindrical section of the chair column. The internal taper of the seat plate, fitted together with the external taper of the chair column, protrudes beyond the transition between cylindrical section and external taper.

10 Claims, 2 Drawing Figures

TAPER CONNECTION ON A CHAIR OR TABLE COLUMN OF ADJUSTABLE HEIGHT

BACKGROUND OF THE INVENTION

For connection a component of a carrier column of adjustable height, especially of a carrier column adjustable in height by means of a gas spring, and a component carried by the carrier column, especially a chair or a table, taper connections are used which comprise an external taper on the upper end of the component upwardly adjoining a cylindrical section and an internal taper on the carried component, receiving the external taper.

STATEMENT OF THE PRIOR ART

In known chair and table columns of adjustable height the external taper as a rule merges into the cylindrical section by way of a transition section with a turning point. The internal taper must not reach into this transition section, since otherwise retention of the internal taper and external taper one within the other is not guaranteed. In order to ensure that the internal taper does not reach into the transition section, a nominal dimension of the internal taper is provided which is adapted to the nominal dimension of the external taper in such a way that for all deviations of the dimensions determining the overlap of internal and external taper which may sensibly be expected, the internal taper remains with its edge of maximum diameter outside the transition region. This signifies that the theoretically possible maximum overlap length of internal and external tapers is not fully exploited and thus strength is sacrificed. In order to reduce notch effects, in the known forms of embodiment the end edge of large diameter of the internal taper, which lies over the external taper, is made with a radius.

OBJECT OF THE INVENTION

It is the object of the invention to provide a taper connection of improved strength and particularly a taper connection in which the full length of the external taper can be used.

SUMMARY OF THE INVENTION

A taper connection between a component of a carrier column of adjustable height, especially a carrier column of height adjustable by means of a gas spring on the one hand, and a component carried by the carrier column, especially a chair or table on the other hand, comprises an external taper upwardly adjoining a cylindrical section, on the upper end of the component and an internal taper on the carried component accomodating the carrier column external taper. The external taper adjoins the cylinder section by a bent section contained within an imaginary prolongation of the external taper towards the cylindrical section. The internal taper protrudes out beyond the external taper towards the cylindrical section.

With the formation in accordance with the invention it becomes possible, independently of deviations of dimensions, to achieve the full overlap at the large diameter end of the tapers, which is important for the strength. The danger of abutment of end edge of large diameter of the internal taper upon the component is avoided, without it being necessary to provide a radius at the large diameter end of the internal taper.

In summary it can be said that the formation in accordance with the invention increases the strength, especially against bending and alternating bending stresses, and thus the permissible operating load, facilitates production and reduces the demands of accuracy of dimension.

It is desirable that the internal taper protrudes with a nominal overhang which ensures an actual overhang in the case of all expectable deviations of the dimensions determining the overhang and precludes contact of an end edge of large diameter of the internal taper with the component under all expectable loading conditions.

As a matter of example it is proposed that the overhang amounts to at least 5%, preferably at least 10% of the nominal length of the external taper.

In view of further increasing the strength of connection it is proposed that the internal taper covers the external taper over its entire nominal length.

The taper connection of this invention is applicable independently of the outer taper being provided on an external telescopic tube receiving a gas spring or on an end section or end extension of the gas spring cylinder itself.

It is desirable that the bent section has a convex curvature along its total extent between the external taper and the cylindrical section when regarded from radially outward. This means that a turning point in the curvature is avoided.

The internal taper preferably protrudes out beyond the bent section such as to overlap the cylindrical section.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to the example embodiment. In detail:

In FIG. 1 a chair foot is designated by 10. This chair foot receives a guide tube 14 through a first taper connection 12 which is not of interest here. At its upper end the guide tube 14 accommodates a guide bush 16. A telescopic tube 18 is telescopically displaceably inserted into the guide bush 16. The telescopic tube 18 receives a gas spring 20 which is made fast axially in the telescopic tube 18. The downwardly emerging piston rod 21 is supported axially fixedly but rotatably on a base piece 22 of the guide tube 14. A valve stem 24 of a blocking valve 26 of the gas spring protrudes from the upper end of the gas spring 20. This valve stem 24 can be loaded through an actuating piston 28 by an operating lever (not illustrated).

The telescopic tube 18 comprises a cylindrical section 18a and an external taper 18b. The external taper 18b is received by an internal taper 30 of a carried component 32. The pitch of the cone amounts for example to 1° to 2°. As shown in FIG. 1, the cylindrical section 18a and the tapered section 18b have substantially the same wall thickness.

Figure 1:
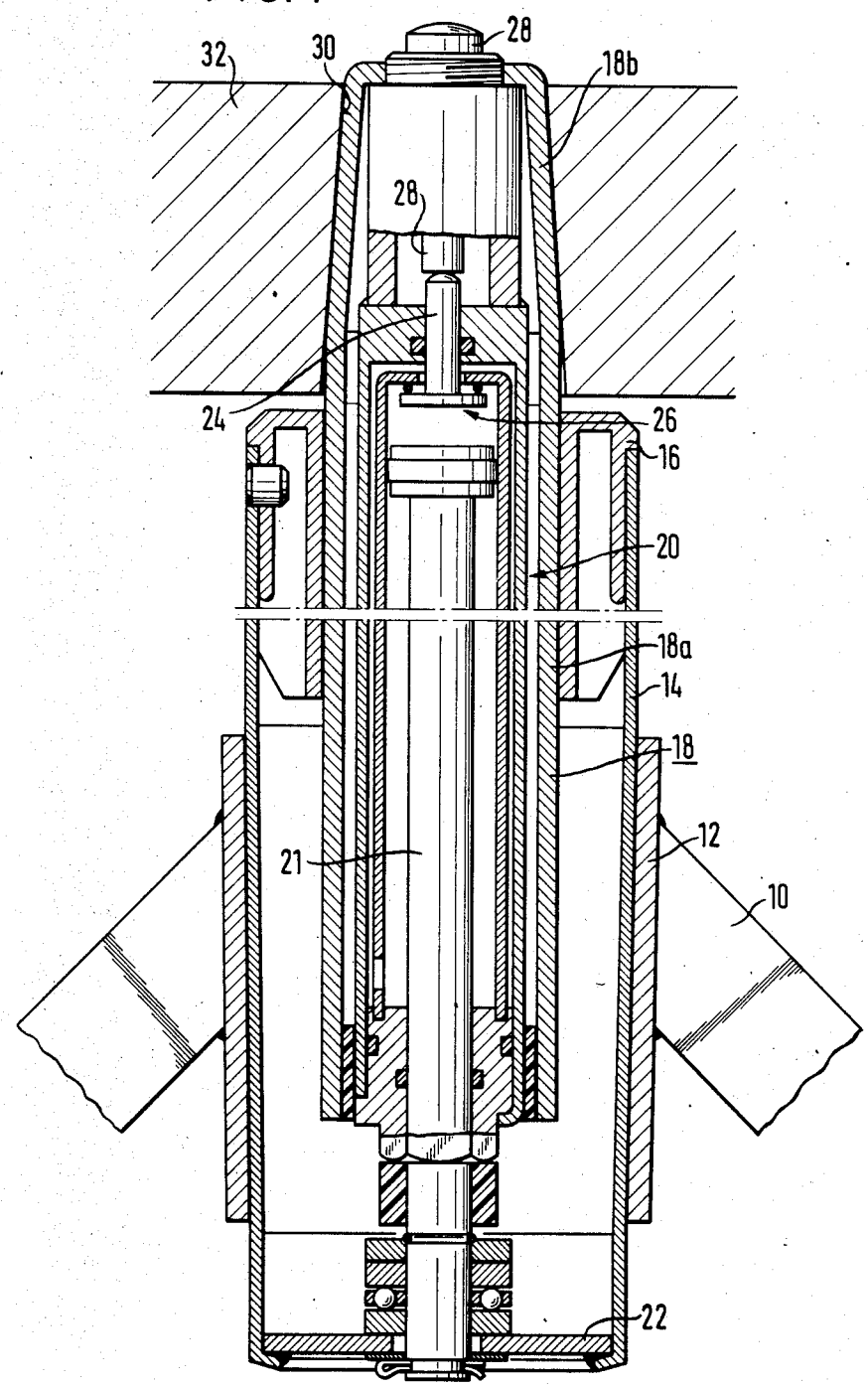
FIG. 1 shows a chair column formed in accordance with the invention.
Figure 2:
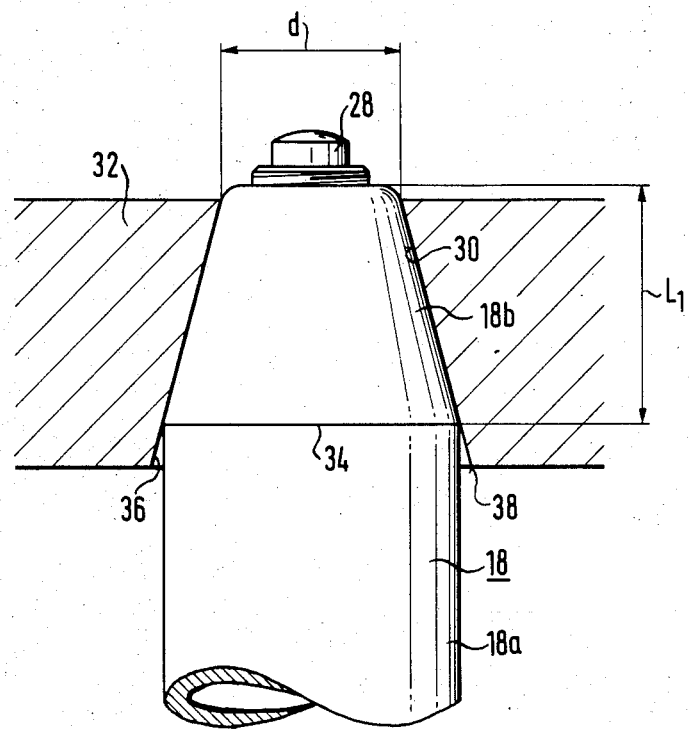
FIG. 2 shows the taper connection in detail.

The taper connection is represented in greater detail individually in FIG. 2. The transition section from the cylindrical section 18a to the external taper 18b is indicated by the line 34. $L_1$ designates the nominal length of the external taper, d the nominal diameter. It is seen that the internal taper 30 protrudes downwards beyond the external taper 18b. The overhang is designated by 36. The length of the overhang 36 of the internal taper 30 beyond the external taper 18b, measured in the axial direction, in the case of the example amounts to about 20% of the nominal length $L_1$. Thus it is ensured that the end edge 38 of large diameter of the internal taper 30 can under no circumstances come into contact with the telescopic tube 18.

The taper connection is also possible if the taper is fitted directly on the gas spring cylinder or in an extension thereof.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. In a combination of a height-adjustable carrier column, having a carrier column component (18), and a component (32) carried by the carrier column the improvement comprising: said carrier column component (18) of said carrier column comprising an integrally formed tube-shaped member having a lower cylindrical section (18a) and an upper conical external taper section (18b) having a nominal length (L1), said taper section (18b) adjoining said cylindrical section (18a) at the upper end thereof at a transition section (34), and said component (32) carried by the carrier column having an internal taper (30) for accomodating said conical external taper section (18b), said internal taper (30) being sized relative to said external taper section (18b) to protrude out beyond said conical external taper section (18b) towards said cylindrical section (18a) and overlies said transition section (34).

2. A taper connection according to claim 1 wherein said internal taper (30) protrudes with a nominal overhang of at least five (5%) percent of said nominal length (L1) of said external taper section (18b), thereby ensuring an actual overhang (36) for all expected deviations of the dimensions determining the overhang, and precluding contact between an end edge (38) of a large diameter of said internal taper (30) with said component (18) of said carrier column under all expectable loading conditions.

3. A taper connection according to claim 2 wherein said external taper section (18b) is formed in an end extension of a gas spring cylinder.

4. A taper connection according to claim 3 wherein said internal taper (30) covers said conical external taper section (18b) over the entire nominal length thereof.

5. A taper connection according to claim 2 wherein said transition section has a radially outward convex curvature along the total extent adjoining said external taper section (18b) and said cylindrical section (18a).

6. A taper section according to claim 5 wherein said conical external taper section (18b), said cylindrical section (18a) and said transistion section (34) are substantially of the same wall thickness.

7. A taper connection as set forth in claim 6 wherein said means for adjusting the height of said carrier column includes a gas spring.

8. A taper connection as set forth in claim 7 wherein said tube shaped member is a telescopic tube adapted to receive said gas spring therein.

9. A taper connection according to claim 7 wherein said component (32) carried by said carrier column is a chair.

10. A taper connection according to claim 7 wherein said component (32) carried by said carrier column is a table.

* * * * *

UNITED STATES PATENT AND TRADEMARK OFFICE
CERTIFICATE OF CORRECTION

PATENT NO. : 4,692,057
DATED : September 8, 1987
INVENTOR(S) : Leo Lauderbach

It is certified that error appears in the above-identified patent and that said Letters Patent is hereby corrected as shown below:

Col. 1, line 6, after "connection" insert --of--;
Col. 1, line 53, "the component" should read --the carrier column component--;
Col. 1, lines 54-54, delete "carrier column";
Col. 1, line 64, delete "the" (second occurrence);
Col. 1, line 65, before "end" insert --the--;
Col. 4, line 1, "overlies" should read --overlie--;
Col. 4, line 25, "section" should read --connection--.

Signed and Sealed this

First Day of March, 1988

Attest:

DONALD J. QUIGG

*Attesting Officer*          *Commissioner of Patents and Trademarks*